United States Patent [19]
Gudmestad et al.

[11] 3,921,472
[45] Nov. 25, 1975

[54] ROTARY WIRE STRIPPER

[75] Inventors: Ragnar Gudmestad, West Allis; Leon J. Gorski, New Berlin, both of Wis.

[73] Assignee: Artos Engineering Company, New Berlin, Wis.

[22] Filed: Mar. 12, 1975

[21] Appl. No.: 557,618

[52] U.S. Cl. ............................................ 81/9.51
[51] Int. Cl.² .......................................... H02G 1/12
[58] Field of Search ................................... 81/9.51

[56] References Cited
UNITED STATES PATENTS

| | | | |
|---|---|---|---|
| 2,789,452 | 4/1957 | Miller | 81/9.51 |
| 3,881,374 | 5/1975 | Gudmestad | 81/9.51 |

Primary Examiner—Al Lawrence Smith
Assistant Examiner—Roscoe V. Parker
Attorney, Agent, or Firm—James E. Nilles

[57] ABSTRACT

A rotary wire stripping machine for removing insulation from the end of an insulated wire including a reciprocating carriage for supporting a rotating head member which has a pair of cutting blades and a guide means for positioning the end of the wire to be stripped. The rotating head member includes a central chamber for receiving the end of an insulated wire and cam means for forcing the blades into contact with the wire to cut the insulation when the carriage is moved to a first position and to pull the insulation off the end of the wire when the carriage is moved to a second position. The machine also includes a means of securely clamping the wire and a means for straightening the wire so that it may be received within the rotating head member.

15 Claims, 20 Drawing Figures

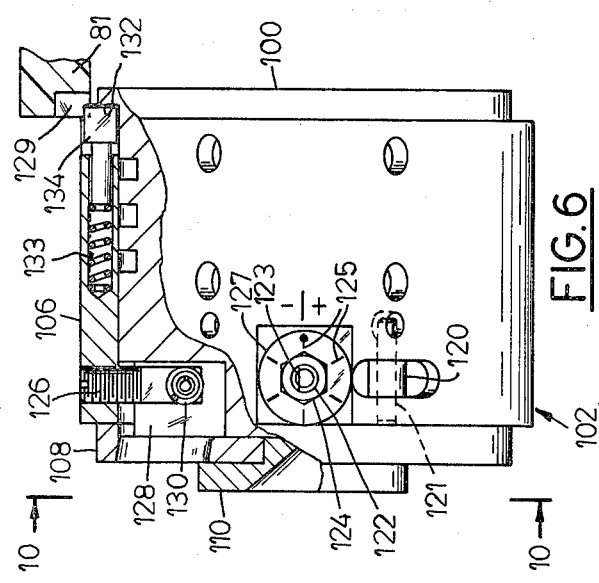
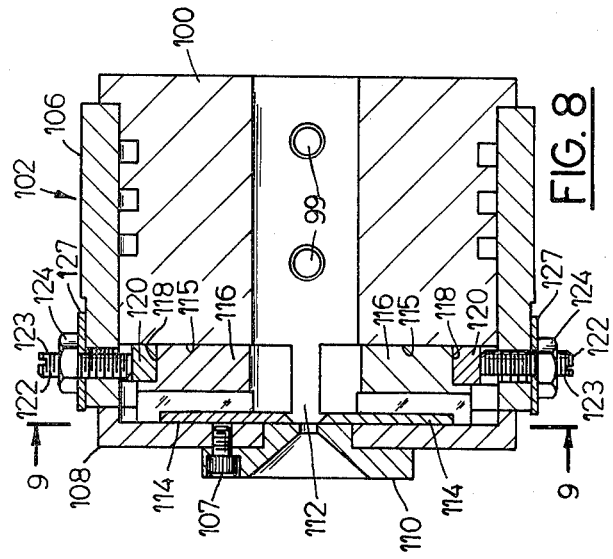
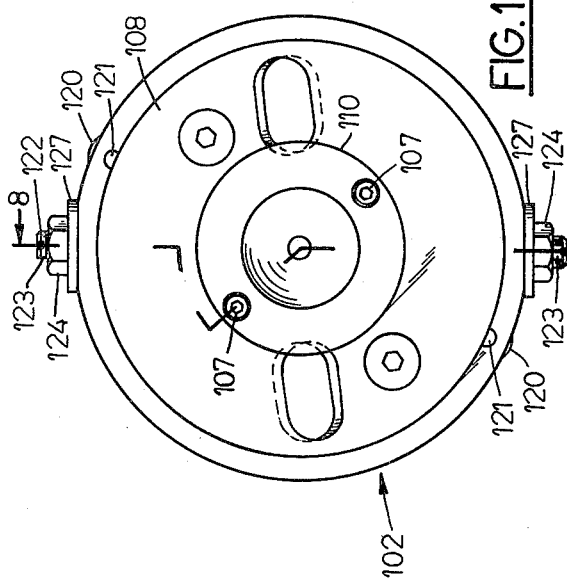
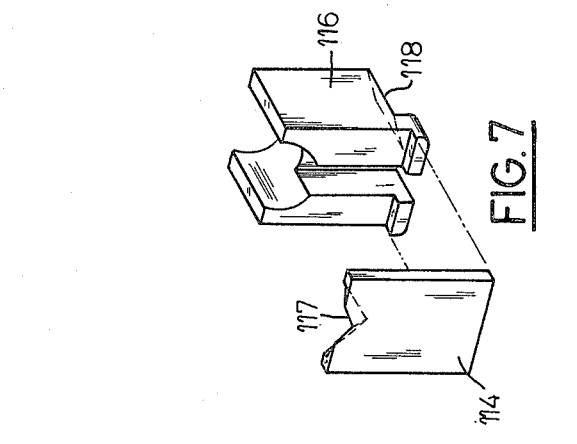
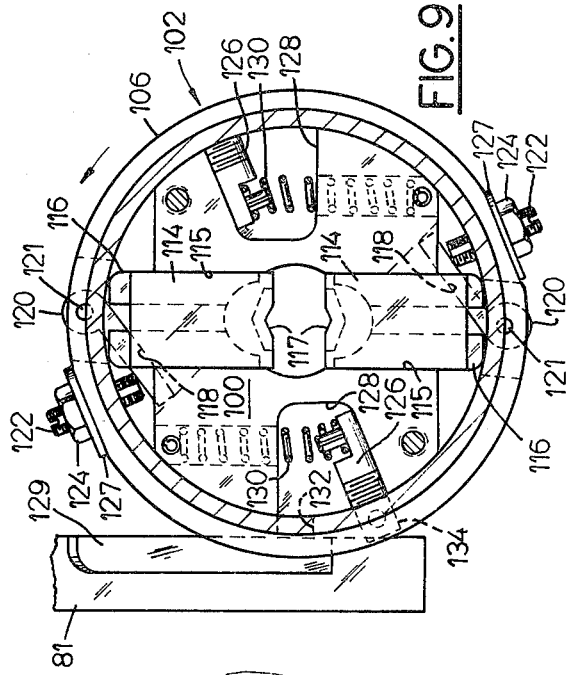
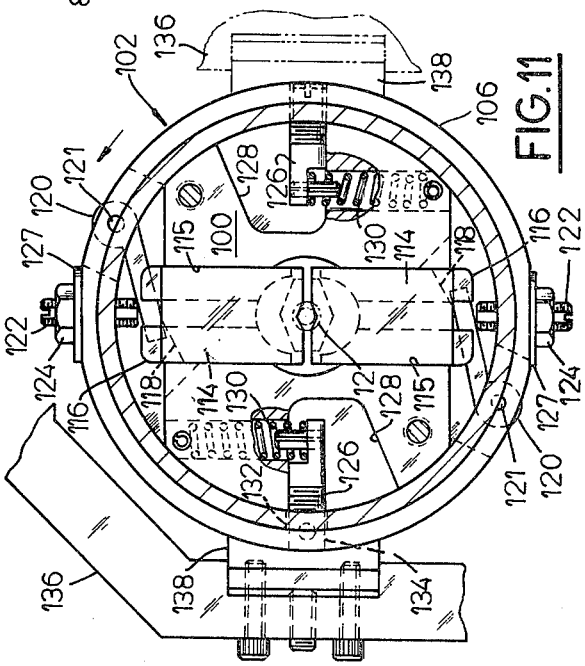

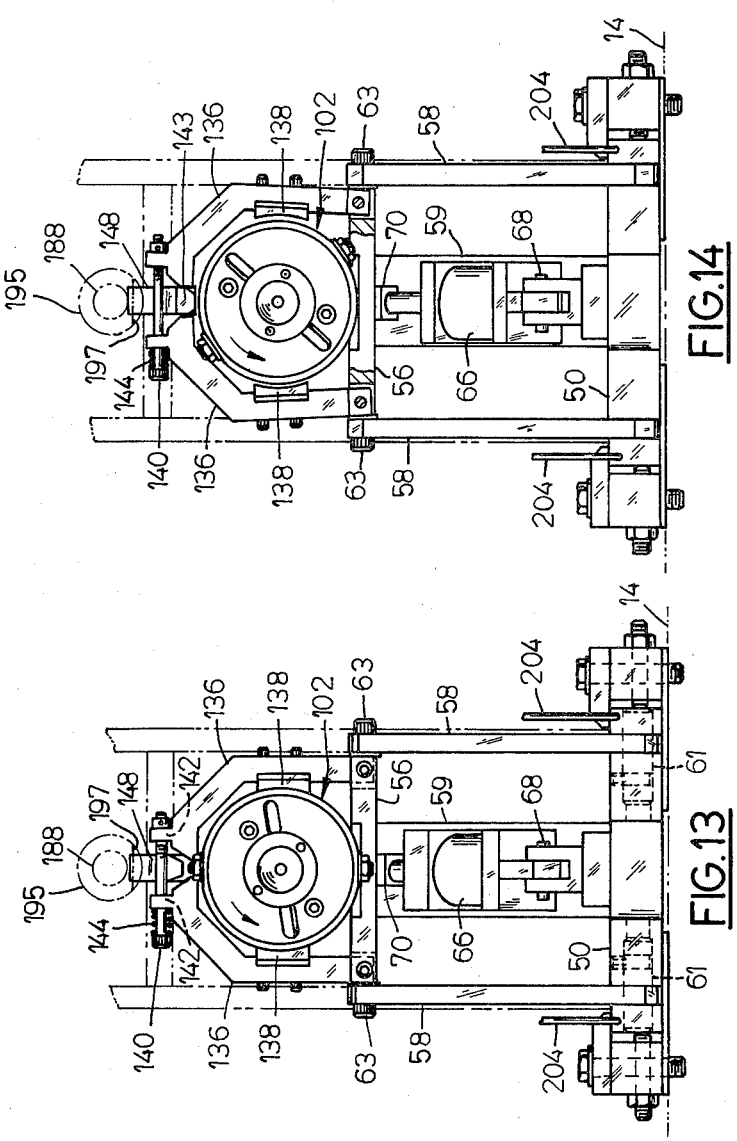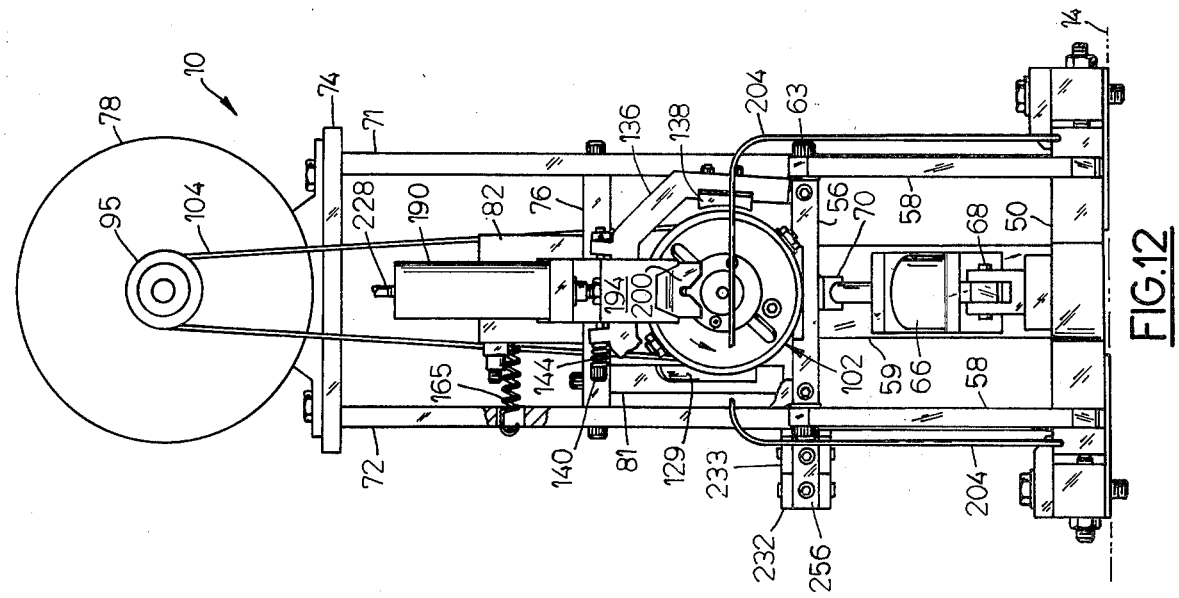

ROTARY WIRE STRIPPER

BACKGROUND OF THE INVENTION

This invention relates to wire strippers for removing insulation material from the ends of wires and particularly to wire strippers having a rotary cutting motion. The invention includes improvements in the structure of the rotary wire stripper disclosed in the U.S. Application Ser. No. 473,274, filed May 24, 1974 by Gudmestad, entitled "Rotary Wire Stripper" and issued May 6, 1975 as U.S. Pat. No. 3,881,374 and assigned to an assignee in common with this application.

SUMMARY OF THE INVENTION

The present invention contemplates a mechanism for stripping a predetermined length of insulation from the ends of wires or coaxial cables as they are advanced to a wire stripping mechanism by a conveyor mechanism and to form a finished end on the wire facilitating further assembly processes. The apparatus of the present invention provides means to strip insulation from a variety of wire types having varying diameters and insulation of varying thicknesses and including coaxial cables. The invention includes a mechanism to adjust the depth of the cut of the blades which is readily accessible to the machine operator and which facilitates extremely accurate control of the adjustment. Furthermore, although the apparatus is designed to perform the stripping operation at repeated high frequency, each cycle of the operation is precisely controlled to bring about a timed relation between the clamping of the wire at a work station, the precise cutting of the insulation or material to be removed from the wire, and the removal of the insulation from the end of the wire member.

The rotary stripping machine of the present invention is designed to function in association with a wire cutting and conveying apparatus which has means for severing established lengths of wire from a spool and conveying these cut lengths to a wire working station such that the wire is axially aligned with the rotary stripper and firmly clamped in position with an end exposed.

The rotary stripping machine includes a rotatable head member containing cutting blades and reciprocable from a disengaged position to a position where the head member engages the end of the wire and cuts insulation therefrom. The rotatable head member includes a central core member which is rotatably driven about an axis which is generally the same as that of the wire to be stripped. This central core member includes a chamber for receiving the end portion of the wire and also includes a pair of blades which are radially slidable in such a manner that they can be forced into contact with the insulation. The rotatable head member also includes an annular member surrounding and somewhat rotatably movable with respect to the core member, the annular member including cam actuating means for forcing the cutting blades radially inwardly.

The present invention also includes a braking assembly for clampingly engaging the annular member to interrupt the rotation of that member and to thereby cause relative rotation of the annular member with respect to the core member. This relative rotation in turn causes engagement of the cutting blades with the insulation on the wire.

The stripping machine also includes a fluid actuated clamping assembly for clamping the wire firmly in place to facilitate the stripping operation and a guide member pivotally mounted to the clamping means in such a manner that, when the clamp member is activated, the guide member is pivoted into engagement receiving the wire in a forked slot so as to straighten the wire and guide it into the chamber in the rotating stripping head.

The present invention has the advantage of providing a rotary stripping head having a much simpler structure than the prior art apparatus designed to perform a similar function. The invention has the further advantage of facilitating the use of vacuum means to remove the insulation which has been stripped from the wires in such a manner that it does not impede the operation of the machine. The invention also provides a funnel positionable on the end of the stripper head and being easily removable to facilitate the use of funnels having various sizes to accommodate wires of substantially different diameters. The present invention also provides an adjustment means for varying the position of the cutting blades which is readily accessible and facilitates extremely accurate adjustment. The present invention also provides a novel means of driving the rotary head in such a manner that the driving motor is not mounted on the reciprocating carriage thereby avoiding undue strain on the reciprocating mechanism due to the additional weight of the motor. Further advantages of the invention are set out in the following description of an embodiment of the invention.

BRIEF DESCRIPTION OF THE DRAWINGS

FIG. 6 is a detailed showing of the rotary stripper head partially in section for the purposes of clarity;

FIG. 7 is an exploded detailed view of a cutting blade and a blade support member;

FIG. 8 is a cross section view of the cutting head taken along line 8—8 in FIG. 10;

FIG. 9 is a cross sectional view taken along line 9—9 in FIG. 8 of the cutting head showing the cutting blades in a retracted position;

FIG. 10 is an end view of the cutting head taken along line 10—10 in FIG. 6;

FIG. 11 is an enlarged view of the cutting head taken along line 11—11 in FIG. 4 and showing the cutting blades engaged by the cam actuating means;

FIG. 12 is an end elevation view of the rotary stripper apparatus shown in FIG. 2 partially cut away in the interest of clarity, the view taken generally along line 12—12 in FIG. 2;

FIG. 13 is a view similar to that shown in FIG. 12 partially cut away for clarity and showing the brake members in an engaged position;

FIG. 14 is a view similar to that shown in FIG. 13 with the brake members shown in a disengaged position;

DETAILED DESCRIPTION

Figure 1:
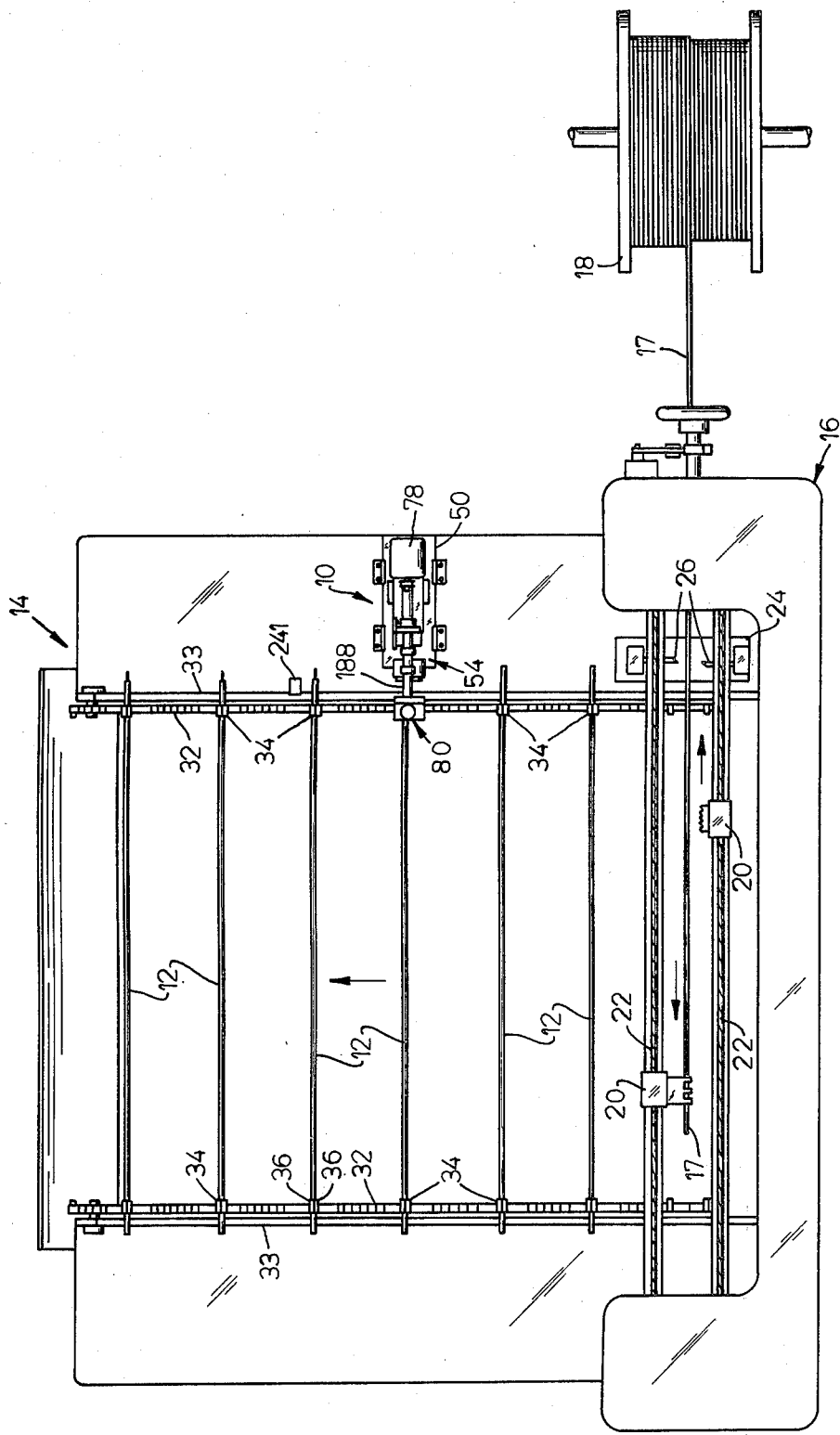
FIG. 1 is a plan view of a wire cutting and conveying machine incorporating a rotary stripper embodying the present invention.

Referring to FIG. 1, the invention is embodied in a rotary wire stripping machine 10 that is adapted to cut insulation from the end of a length of a cable or wire member 12 and to pull the cut material and insulation from the end of the wire.

Wire members 12 are advanced in succession along a path by a wire conveying machine 14 which in turn receives the wire members 12 from a wire feeding and cutoff machine 16. The machine 16 operates to withdraw the end of an insulated wire 17 from a supply on a reel 18. The conveyor 14 and wire feeding and cutoff machine 16 are generally of the type shown and described in detail in U.S. Pat. No. 3,029,494.

In general, the wire feeder and cutoff machine 16 includes a pair of oppositely reciprocating wire feeding clamps 20 secured in fixed position to cables 22 which are driven in a manner to move the clamps 20 transversely to the direction of movement of the conveyor 14 and at one end of the latter. The clamps 20 move past a wire cutting mechanism 24 located at one end of the feed and cutoff machine 16 and at one side of the conveyor machine 14.

The clamps 20 are adapted to be opened and closed in timed relation with the various other mechanisms. In operation the clamps 20 travel in opposite directions past each other and past the wire cutoff mechanism 24. One of the clamps 20 is closed to grip the free end of the wire stock 17 and pull the wire from the supply reel 18 while the other clamp 20 remains open during its return an equal distance in the opposite direction to a starting position beyond the cutoff mechanism 24. When the end of the wire 17 is moved to the end of its feed stroke, the other clamp 20, which is adjacent the cutoff mechanism, grips the end of the incoming wire stock 17. At the end of each such feeding stroke, and while both of the clamps 20 remain closed, the knives 26 are actuated to sever a length of wire 12 from the wire stock 17. Thereafter, the clamp 20 which has completed its feeding stroke is opened and returned as the other clamp 20 remains closed to feed the free end of the wire supply 17 past the knives 26.

The conveyor 14 for receiving the cut lengths of wire or wire members 12 includes a pair of endless conveyor chains 32 which are simultaneously driven in a suitable manner in timed relation with the wire feeding and cutoff mechanism 26 to intermittently advance the wire members 12 from one work station to another. Each of the chains 32 is supported on a rail or frame 33 so that the upper run of each of the conveyor chains 32 is maintained in a generally horizontal position during its movement. Each of the chains 32 carries a series of wire grippers 34 spaced apart equal distances to maintain the wire members 12 in parallel relationship as they travel from one work station to another and from one end of the conveyor machine 14 to the other.

Figure 16:
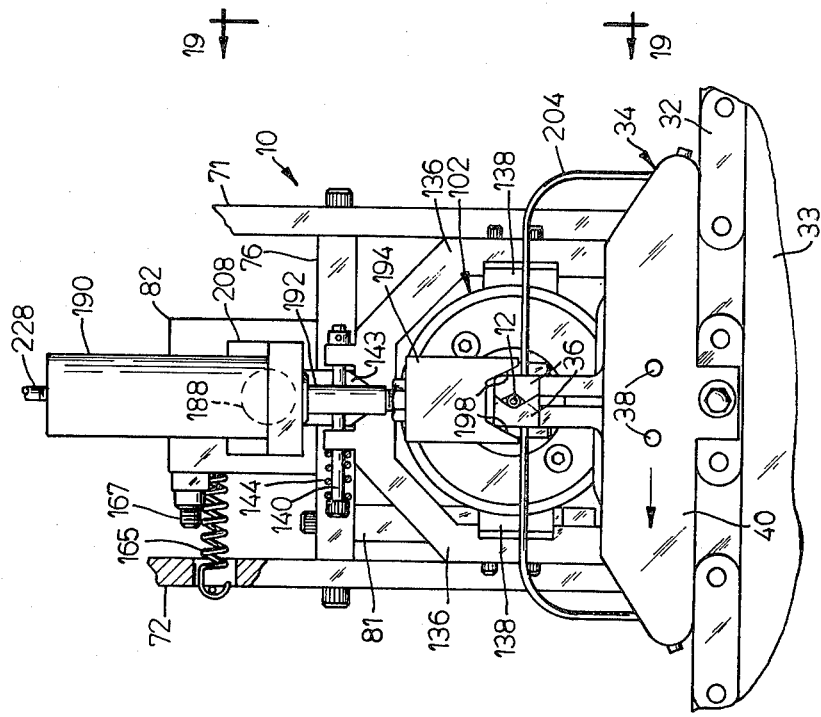
FIG. 16 is a view similar to that shown in FIG. 15 but showing the clamping assembly in an engaged position.
Figure 15:
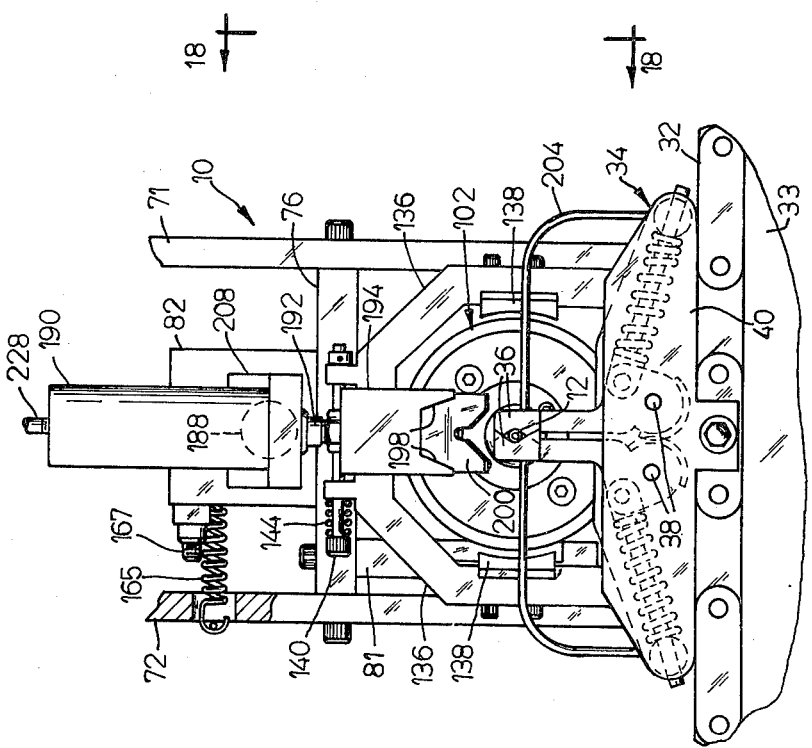
FIG. 15 is an enlarged end view of the wire clamping assembly and taken along line 15—15 in FIG. 2.

As seen in FIGS. 15 and 16, each of the wire grippers 34 comprises a pair of jaws 36 mounted on pivot pins 38 which are carried by a support 40 secured to selected links of the conveyor chains 32. The jaws are interconnected so that they swing simultaneously in opposite directions from an open position to the wire gripping position in which they are shown in the drawings. The jaws of the wire grippers 34 of the two conveyor chains 32 are simultaneously operated in timed relationship with the wire feed and cutoff mechanism 16 as described in detail in U.S. Pat. No. 3,029,494.

As the pair of grippers 34 supported on the chains 32 approach the work station or zone in which the wire members 12 are being formed from the wire stock 17, the jaws 36 of the grippers are in an open position. As each wire severing operation is being conducted, the jaws 36 of the grippers 34 at opposite sides of the conveyor 14 and adjacent to the wire 17 are moved to a closed position to simultaneously grip the wire 17. After the wire 17 is severed into a wire member 12 of predetermined length the grippers 34 at each end of the wire member 12 move to convey the wire member 12 to the next work station at the same time a new wire severing cycle is begun.

Figure 2:
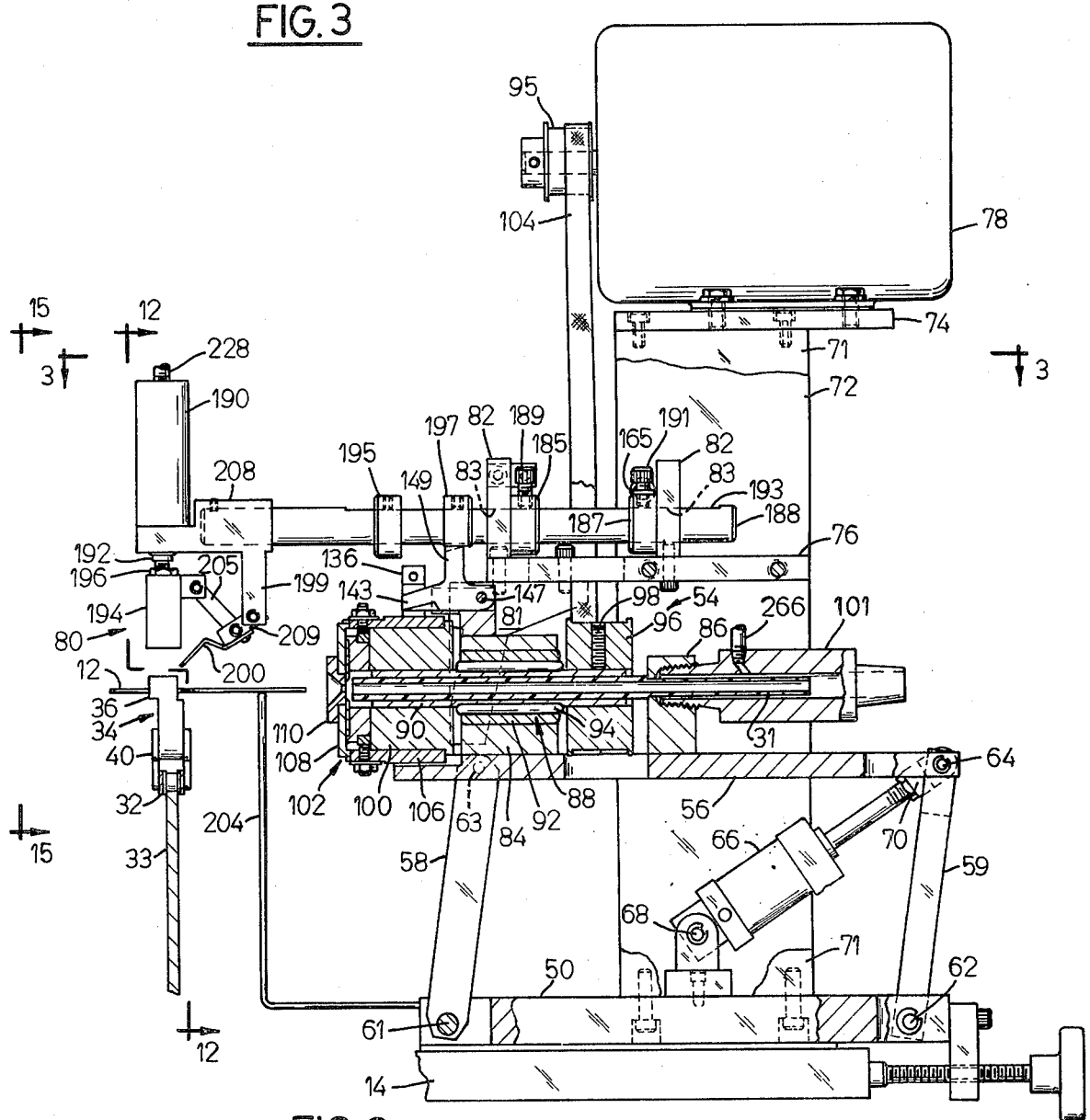
FIG. 2 is a side elevation of the rotary stripper shown in FIG. 1 but at an enlarged scale and partly in section with the rotary stripper shown in an inoperative position.
Figure 5:
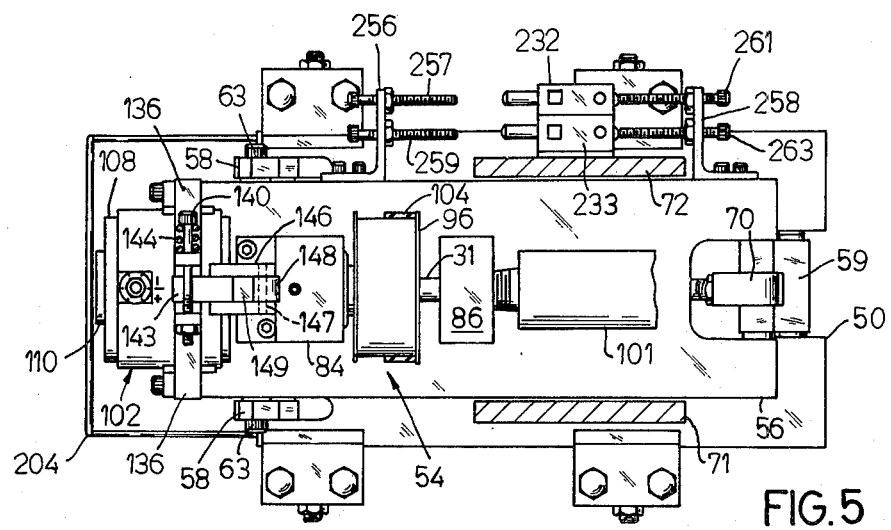
FIG. 5 is a view taken along lines 5—5 in FIG. 4.
Figure 4:
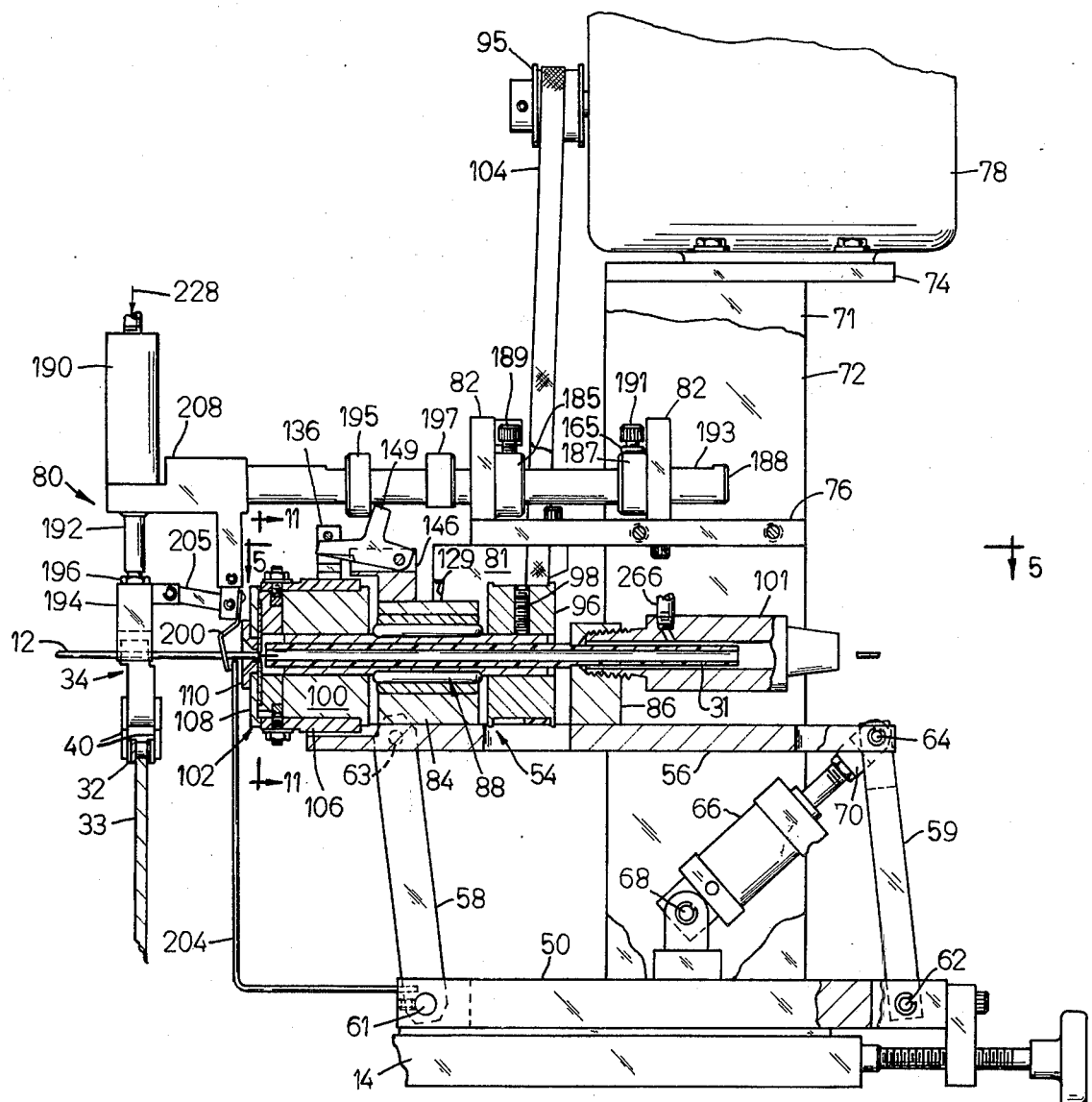
FIG. 4 is a view similar to that shown in FIG. 2 but showing the rotary stripper in the operative position.

In general, the wire stripping machine 10 seen in FIGS. 2 and 4 includes a base 50 which may be securely mounted in a selected position at one of the wire working stations on the wire conveying machine 14 which advances the wire members 12 from station to station. A rotary cutting and stripping assembly 54 is supported on a carriage or table 56 for movement relative to the base 50 from the position shown in FIG. 2 to the position shown in FIG. 4. In the latter position the stripping machine 10 is positioned to receive the end of the wire 12 and to perform its stripping operation.

The carriage 56 is supported in an elevated position above the base 50 by arms 58 and 59. The lower ends of the arms 58 and 59 are pivotably connected to the base 50 by pins 61 and 62, respectively, and the upper ends of the arms are pivotably connected to the carriage 56 by pins 63 and 64, respectively. The arms 58 and 59 serve to support the carriage 56 during generally horizontal movement relative to the stationary base 50 between the position shown in FIGS. 2 and 4. The carriage 56 is moved between its two positions by means of a double-acting air actuator 66 which has its cylinder end portion pivoted by means of a pin 68 to the base 50. The rod end of the cylinder 66 is provided with a connecting element 70 which, as seen in FIG. 4, is connected to the pin 64 supporting the upper end of the arm 59 to the carriage 56. In the extended position of the air cylinder 66, shown in FIG. 2, the table is maintained in spaced relation with respect to the end of the wire member 12 and, upon retraction of the cylinder 66, the table 56 is moved to the wire working position shown in FIG. 4.

The machine 10 also includes vertically extending opposed mounting brackets 71 and 72 which support horizontal mounting plates 74 and 76. Horizontal mounting plate 74 rigidly supports an electric motor 78 which serves to continuously rotate the wire stripping mechanism during the stripping operation. Horizontal mounting plate 76 supports mounting members 82 which in turn support the clamp locking assembly 80. The mounting member 76 also supports the cam block 81 to be more fully described later.

ROTARY STRIPPER ASSEMBLY

The rotary stripper assembly 54 shown in FIGS. 2 and 4 is supported on the horizontally reciprocable carriage 56 by two block members 84 and 86. Bearing block member 84 houses a bearing member generally designated 88 which includes an inner race 90, an outer race 92 and rollers 94. The inner race 90 of the bearing is secured at one end to a pulley 96 by set screw 98 and at the other end by set screws 99 (FIG. 8) to the core member 100 of the rotary stripper head 102. Core member 100 is therefore driven directly by the pulley 96 which is connected by means of the drive belt 104 to the electric motor 78.

As generally shown in FIGS. 2 and 4, and more specifically shown in FIGS. 6–11, the rotary stripper head 102 includes the central core member 100 surrounded by a relatively rotatable annular member 106. Attached to the core member 100 is a front plate 108 and a funnel member 110 secured to the front plate 108 by screws 107. The core member 100 includes a central chamber 112 for receiving therein the end of an insulated wire 12 to be stripped. The core member 100 also accommodates a pair of blades 114 and blade support members 116 in such a manner that the blades 114 and blade support members 116 are radially slidable in grooves 115 in said core member. Each of the blade support members 116 includes at its radial outer end a camming surface 118 in surface contact with a cam actuating means 120 which is pivotally connected to the annular member. Each of the cam actuating members are pivotable about pins 121 which have axes which are generally parallel to the axis of rotation of the rotary stripper head. The relative position of each of the cam actuating means 120 can be adjusted by means of an adjusting screw 122 which is threadably secured through the annular member 106 and fixed thereto by the nut 124. Each of the adjusting screws 122 includes a flat surface 123 on one side to receive a washer 127 having a complementary flat surface such that the washer is rotatable with the screw 122. The washer 127 includes a plurality of indices 125 to show the relative position of the screw and to facilitate accurate adjustment of the cam actuating means 120 and consequently of the blade 114. The annular member 106 is designed to be rotatable to some extent with respect to the core member 100 but is limited in that rotation by the spring biased pins 126 which are secured to the annular member 106 and receivable in bores 128 in the core 100. As shown in FIG. 9, the pins 126 have a radially inner end which is acted upon by a compression spring 130 tending to cause the annular member 106 to rotate in a counterclockwise direction with respect to the core member 100.

As shown in FIG. 6, the core member 100 includes a notch 132 for receiving a spring biased latch member 134 which is received within a bore 133 in the annular member 106. When the pin member 134 is received within notch 132 the pin causes the annular member 106 and the core member 100 to rotate together in generally locked relationship. However, when the biased latch 134 is not engaged in the notch 132, the annular member 106 is free to roate in a limited manner with respect to the core member 100 as previously described.

As shown in FIGS. 12–14, the carriage 56 supports at each of its sides a brake support arm 136 which includes a rigidly attached brake shoe 138. At their upper ends the brake support arms 136 are connected by a bolt 140 passing through bores 142 in the arms 136 and biased toward each other by the spring 144. The spring 144 thus causes a clamping or braking engagement of the brake shoes 138, as shown in FIG. 13, against the outside surface of annular member 106 to interrupt or retard its rotation.

As also shown in FIGS. 2 and 4, the bearing block 84 also supports a bracket 146 which in turn supports a pivotable brake camming member 148. The brake camming member 148 can be activated in such a manner as to fit between the upper ends of the brake support arms 136 and to force them away from each other so as to disengage the brake shoes 138 from the annular member 106 as shown in FIG. 14. However, as shown in FIG. 13, the brake camming member 148 may be pivoted out of the gap between the brake arms 136 and allow spring 144 to bias the brake members 138 against the surface of the annular member.

CLAMP LOCK ASSEMBLY

Figure 3:
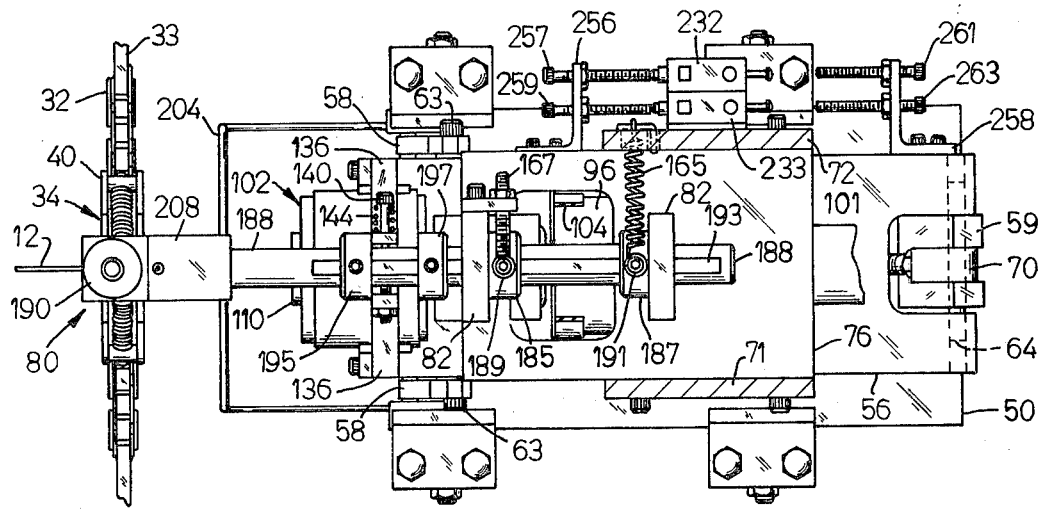
FIG. 3 is a view of the machine shown in FIG. 2 taken along lines 3—3 in FIG. 2.
Figure 18:
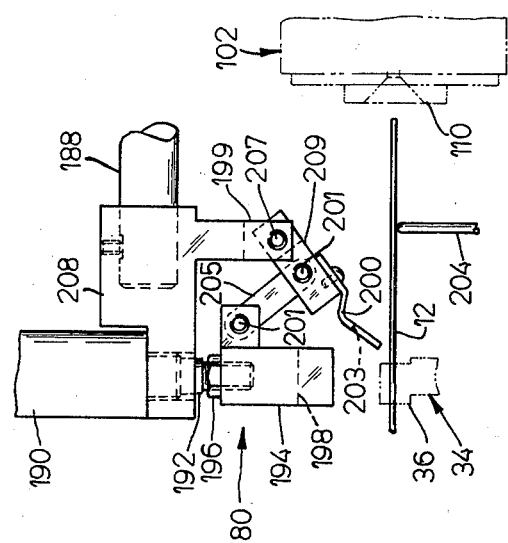
FIG. 18 is a side elevation view of the wire clamping and guide assembly in the disengaged position taken along line 18—18 in FIG. 15.
Figure 19:
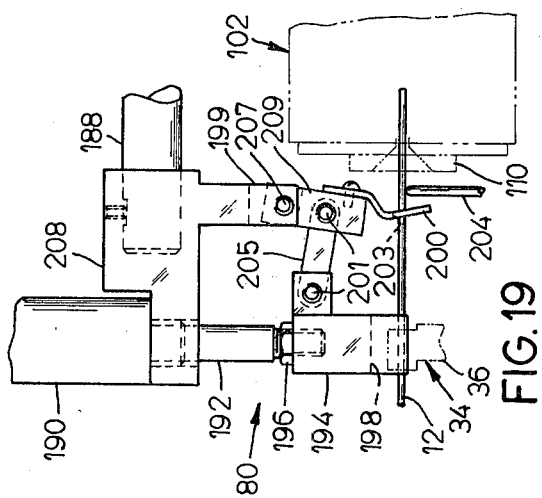
FIG. 19 is a view similar to that shown in FIG. 18 but in the engaged position taken along line 19—19 in FIG. 16.
Figure 17:
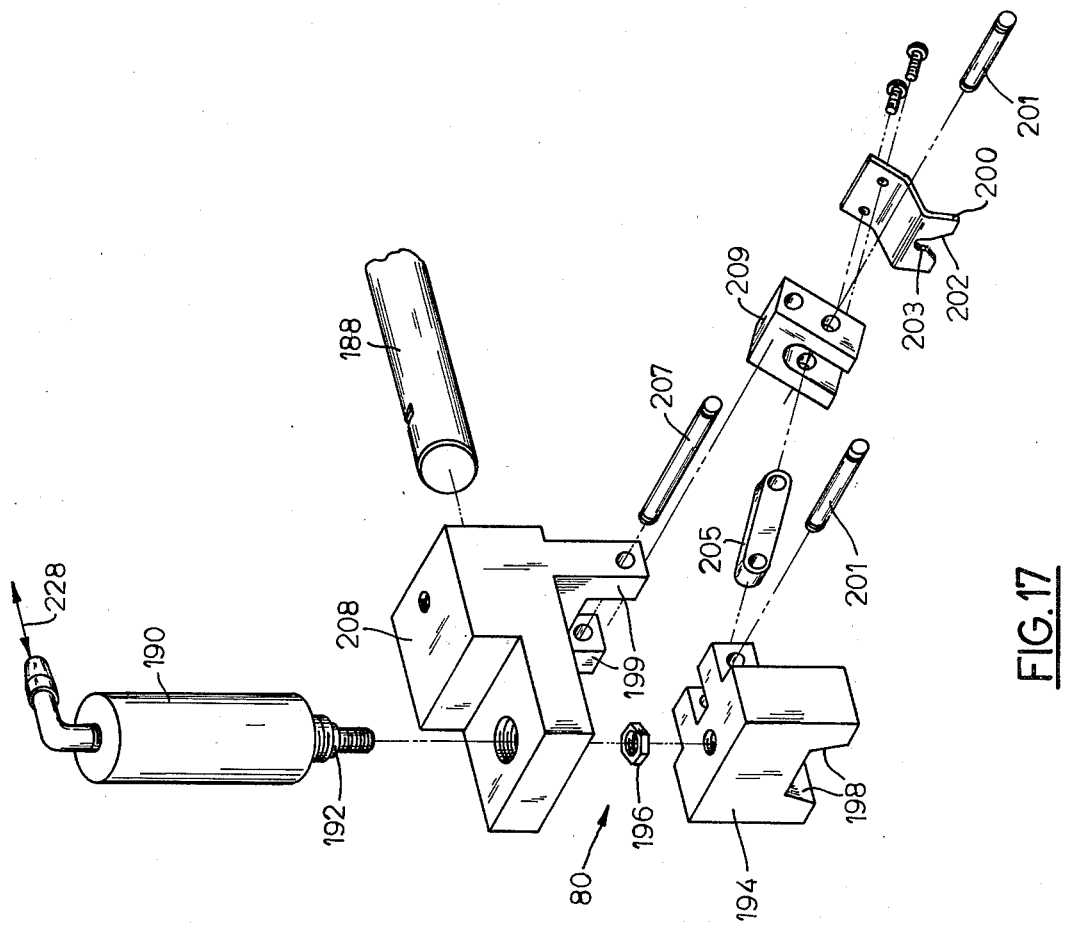
FIG. 17 is an exploded view of the wire clamping assembly.

The clamp lock assembly generally designated 80 is supported in elevated position above the table 56 by a pair of vertical mounting members 82 which can be seen in FIGS. 2 through 5. The mounting members 82 each include bores 83 for rotatably supporting a shaft 188 in an elevated position and projecting to the left of the base 50 as seen in FIGS. 2 and 4. The rotatable shaft 188 includes a pair of collar members 185 and 187 which are secured to the shaft 188 by set screws 189 and 191 which abut a flat surface 193 of the shaft 188. The collars 185 and 187 are located between the mounting members 82 and abut the members such that they preclude any axial movement of the shaft 188 but do not preclude rotation of the shaft. The shaft 188 also supports a pair of cam abutment collars 195 and 197. The left end of the shaft 188 supports by means of a journal 208 a single acting, spring returned air actuator 190 having an actuating rod 192 which can be reciprocated vertically above the conveyor chain 32 and the wire clamping members 36, as seen in FIG. 3. The end of the actuator rod 192 threadably receives a clamp lock element 194 which is secured to the actuator rod 192 by means of a lock nut 196. As best seen in FIGS. 16 through 17, the clamp lock 194 has a recess at its underside with facing inclined walls 198. Upon extension of the air actuator 190 from the position shown in FIG. 18 to the position shown in FIG. 19, and as shown in FIG. 16, the walls 198 engage the pair of wire gripping jaws 36 and wedge them together to insure that the wire member 12 is locked in position. Also supported from the rod 192 of the air actuator 190 and from a pair of downwardly extending projections 199 of the journal 208 is a wire guide 200 rigidly secured to support 209, both of which move with the clamp lock 194. The wire guide 200 has a generally V-shaped wire guiding slot 202 which merges with a wire receiving slot 203, shown in FIG. 17. The wire guide 200 and support 209 are pivotably connected by pins 201 and by link 205 to the clamp lock 194 and by pin 207 to the end of the downwardly extending projections 199 of the journal 208. Upon extension of the air cylinder 190 from the position shown in FIG. 18, the link 205 causes the wire guide 200 to pivot around pin 207 in such a manner that the wire guiding slot 202 guides the wire 12 into the wire receiving slot 203 which serves to straighten and to align the wire member 12, as the wire guide 200 continues to pivot in response to the he continued downward motion of the clamp lock 194, in such a manner that the end of the wire 12 is guided into a position of axial alignment with the funnel 110 attached at the end of the rotary stripping head 102. The guide member 204 shown, for example, in FIGS. 4 and 12, also functions to maintain the alignment of the end of the wire 12 in that, as the conveyor delivers the wire to the stripping station, the end of the wire will rest on the upper surface of guide member 204.

Referring now to FIG. 3, it can be seen that the set screw 191 is attached to a spring member 165 which is attached at its other end to a projection of the rigid bracket 72. Attached to one of the members 82 is a set screw 167 which abuts the set screw 189 to limit the rotation of the shaft 188. The spring 165 and the set screw 167 serve to yieldingly maintain the air actuator 80 in a generally vertical position as shown in the drawings. In the event that the clamp lock 194 is in engagement with the jaws 36, as shown in FIG. 16, and the chain 32 is accidentally advanced to the left, the clamp lock 194 may be pivoted about the axis of the shaft 188 to swing the air actuator 190 so that the air actuator and its a associated clamp lock are not damaged. If it is desired to move the conveyor in the opposite direction relative to the machine 10, the positions of the spring 165 and the screw 167 may be reversed with respect to the machine to allow the shaft to rotate in a direction opposite to that indicated in the drawings.

OPERATION

The wire stripping machine 10 is intended to operate in frequent repeated cycles so that the ends of the wire members 12 can be rapidly prepared. A single cycle of operation can be considered, for example, as being initiated when the various components of the stripping machine 10 occupy the position shown in FIG. 2. Under such conditions, a wire member 12 will have been advanced to the station occupied by the wire conveyor machine 14 so that the wire member 12 is held in a supported, generally horizontal position with its end in spaced relation with respect to the rotary stripper assembly 54. The carriage 56 will be in its extreme right position with the air actuator 66 extended, and the motor 78 will be driving the rotary stripping assembly by means of belt 104 and pulley 96. The core member 100 of the rotary stripping machine 54 and the annular member 106 will be in the relative positions, as shown in FIG. 9, with the springs 130 extended and the blades 114 in a radially outward position.

The wire stripping cycle is initiated by retracting the cylinder 66 so that the table 56 is moved to the left from the position shown in FIG. 2 to the position shown in FIG. 4. Simultaneously with the initiation of such table movement, the air cylinder 190 is extended to move the rod 192 downwardly so that the clamp lock 194 engages the jaws 36 of the gripper 34 to lock the wire member 12 in a secured position while the free end of the latter is being straightened and guided by the wire guide 200 into the funnel 110 so that the end of the wire 12 is positioned within the chamber 112 in the core 100 as seen in FIG. 4. As the rotary stripper head is moved to the left by activation of the cylinder 66, the upwardly extending projection 149 from the brake camming member 148 contacts the collar 195 thereby causing the brake camming member 148 to pivot about pivot pin 147, pulling the camming projection 143 from between the brake support arms 136 and allowing the spring 144 to bias the brake support arms 136 together and the brake shoes 138 into braking contact with the outside surface of the annular member 106. Such braking of the annular member 106 causes a relative rotation of the annular member with respect to the core member 100 in such a manner that the springs 130 are compressed as shown in FIG. 11, and such that the cam actuating means 120 acts against the cam surface 118 of the blade support 116 and forces blade support 116 and the blades 114 radially inwardly into a cutting position. The V-shaped cutting edges 117 of the blade elements thus engage and cut through the insulation material of the wire 12 engaged by the blades. The depth of such a cut is determined by the relative position of the cam actuating means 120. This relative position can be regulated and readily adjusted by the screws 122 such that various thicknesses of insulation may be cut.

When the annular member 106 and core 100 have assumed the position shown in FIGS. 6 and 11, the spring biased latch 134 positioned in the bore 133 in the annular member is received in the complementary notch 132 in the core member 100. Movement of the latch 134 into the notch 132 locks the annular member 106 and core member 100 in their respective relative rotational positions so that they rotate together with the blades locked in cutting engagement.

Figure 20:
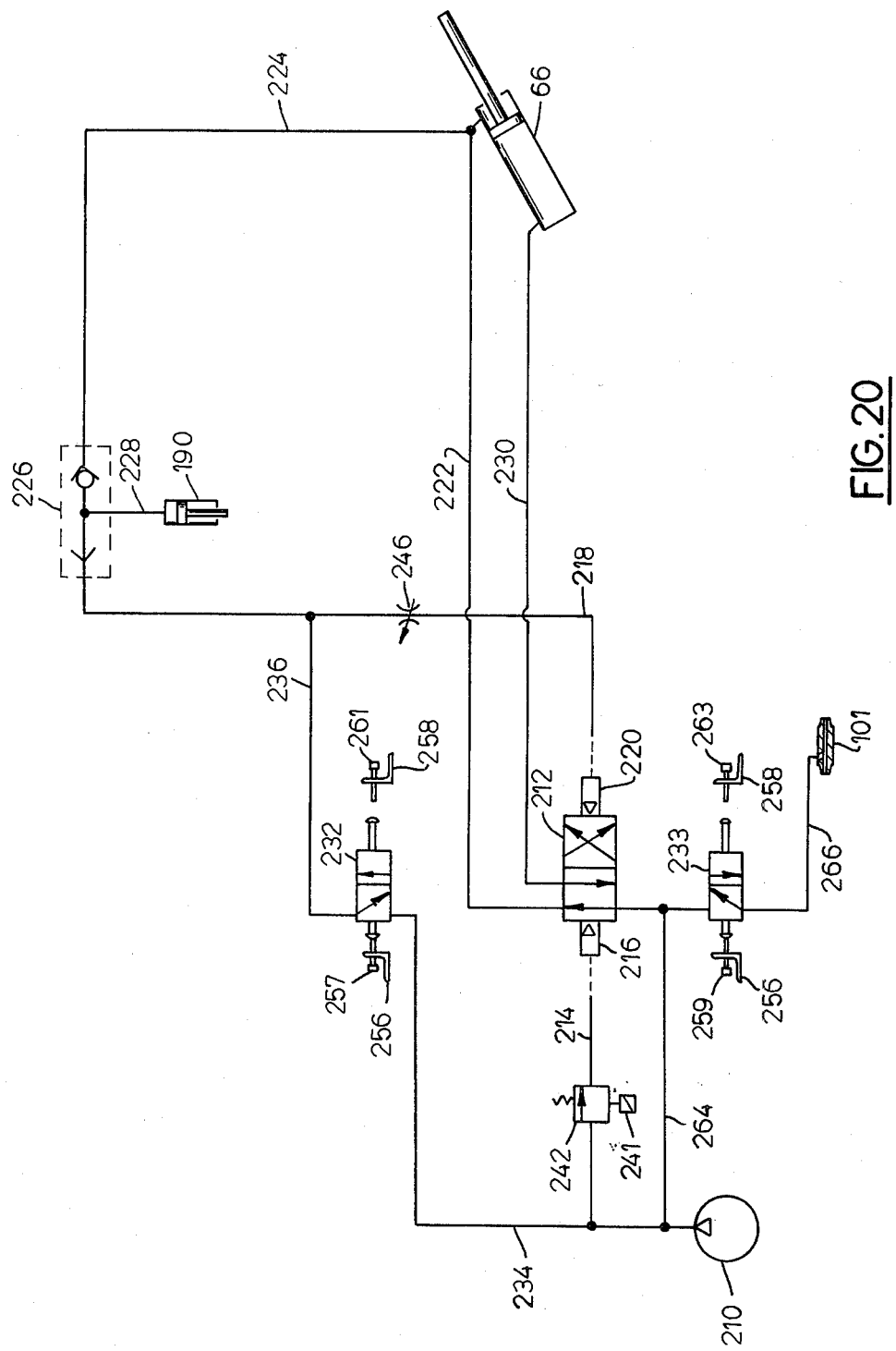
FIG. 20 is a schematic diagram of the fluid control system of the present invention.

After the insulation on the end of the wire has been cut, the air actuator 66 is extended from the position shown in FIG. 4 to the position shown in FIG. 2 so that the carriage 56 is moved to the right. This causes the radially inwardly engaged blades to pull the severed material such as insulation and shielded material off the end of the wire member 12. After the table moves sufficiently to remove the insulation from the end of the wire 12, the cylinder 190 may be retracted to the position shown in FIG. 2. The severed insulation portion will be pulled through an insulation discharge tube 31 by the rearward fluid flow in tube 31 caused by fluid flow through the vacuum nozzle 101 and past the rearward end of tube 31. This arrangement prevents the waste insulation material from jeopardizing proper operation of the stripping machine. Fluid flow is supplied to the vacuum nozzle 101 from an air supply 210 and through line 264, valve 233 and line 266, as illustrated in FIG. 20.

As the air cylinder 66 is actuated to cause the table 56 to return to the position shown in FIG. 4, the upwardly extending projection 149 of the brake camming means 148 contacts the collar 197 and is forced to pivot about pivot pin 147 in such a manner that the projection 143 is forced between the brake supporting arms 136 thereby disengaging the brake shoes 138 from the outer surface of the annular member 106. Furthermore, as the table 56 returns to the position shown in FIG. 2, the spring biased latch 134 rotates into contact with a camming surface 129 of member 81 and is thereby forced out of the notch 132 to allow relative rotation of the annular member 106 and the core member 100. The spring members 130 of the core member 100 can then act on the pins 126 to cause the annular member 106 to rotate with respect to the core 100 to the position shown in FIG. 9. Such rotation causes the cam actuating means 120 to release the blade guides 116 so that centrifugal force caused by rotation of the core member can move the blades and blade guides radially outwardly to a disengaged position.

Retraction of the air cylinder 190 releases the clamp lock 194 from the jaws 36 so that the conveyor chain 32 may then be advanced to position a new wire 12 in readiness for the next cycle of operation of the wire stripping machine 10.

The pulley member 96 and the pulley member 95 attached to the motor 78 are both provided with lands which are substantially wider than the drive belt 104, the width of the lands allowing reciprocating motion of the rotary stripping mechansim 54 with the carriage 56 without substantial twisting of the drive belt 104.

FLUID PRESSURE CIRCUIT

Since the entire operating cycle of the stripping machine 10 occurs very rapidly, the sequence of operation of the air actuators 66 and 190 is extremely critical and accomplished by an air control circuit best understood from an example of FIG. 20. An air supply 210 delivers air pressure in the order of 80 p.s.i. to the circuit and to a two-position valve 212. The valve 212 is moved to the position shown by a signal of air delivered through a line 214 to an air actuating pilot cylinder 216 or to its second position by air delivered through a line 218 to an air actuated pilot cylinder 220. In the position of the valve 212 shown in FIG. 20, air is delivered from the valve 212 through a line 222 to the rod end of the air actuator 66 associated with the table and simultaneously through a line 224 to a shuttle valve 226 and through a line 228 to the clamping cylinder 190. Simultaneously with the delivery of air to line 222, and to the rod end of the air actuator 66, air is expelled from the opposite end of the cylinder 66 through a line 230 to the valve 212 and to the atmosphere.

Upon delivery of air to the line 218, the pilot cylinder 220 is actuated to shift the valve 212 to its second position so that air is delivered from the air supply 210 through line 230 to the piston end of the air actuator 66 to cause extension of the latter. At the same time that air is being delivered in the line 230, air is being exhausted from air cylinder 190 to the shuttle valve 226 and through line 222 through the valve 212 to the atmosphere.

The air control circuit also includes a valve 232 which is shown in its closed position and which is connected to receive air from the air supply 210 by way of a line 234. In an open position of the valve 232, it is connected by line 236 to the line 218 which delivers air to the pilot 220 and also to the shuttle valve 226.

The air control circuit also includes a solenoid operated valve 242 which is connected to the source of air pressure 210 and to the line 214 operating the pilot cylinder 216 associated with the valve 212. The valve 242 is moved from a closed to an open position in response to actuation of the solenoid upon receiving an electrical impulse from a control system 241 shown in FIG. 1 and associated with the conveyor chain 32 so that, as the chain moves to each of its indexing positions, the solenoid valve 242 is actuated to deliver an impulse of air to the pilot cylinder 216.

The circuit also includes an adjustable variable orifice flow control valve 246 which is disposed in the line 218 for a purpose to be described hereinafter.

The circuit shown in FIG. 20 is shown at the instant following the delivery of an impulse of air to the pilot 216 with the machine 10 in the condition shown in FIG. 2 and with the air actuator 66 extended. Air will be delivered from the air supply 210 and through the valve 212 and the line 222 to retract the cylinder 66 and at the same time to extend the air actuator 190. This will bring about simultaneous movement of the carriage 56 from the position shown in FIG. 2 to the left and will place the clamp cylinder 190 into operation to clamp the jaws 36 on the wire member 12. Referring now to FIG. 4, when the table 56 moves to its extreme left position, a bracket 256 secured to the side of carriage 56 and including a pair of adjustable screws 257 and 259 is positioned to move relative to the valves 232 and 233. Referring now to FIG. 20, the valve 232 is in a position illustrated when the carriage 56 is in its extreme right position and the screw 257 of bracket 256 has engaged the left push-button on the valve 232. As the table moves to the left in response to retraction of the air actuator 66, the screw 261 of the bracket 258 engages the push-button at the right of the valve 232 to move the latter to its open position so that air is delivered through the lines 234 and 236 to allow air to be metered through the variable orifice valve 246 which delays the operation of delivery of air to the pilot cylinder 220. Such delay is required to insure that sufficient time is allowed for the cutting edges 117 to cut the insulation on the wire. The valve 246 may be adjusted so that the pilot cylinder 220 will not be actuated until the air in the line 218 between the valve 246 and the pilot cylinder 220 achieves a level of approximately 60 p.s.i. When this occurs, the valve 212 is shifted to its other position so that air is exhausted from the rod end of the cylinder 66 and at the same time, air is delivered through line 230 to cause extension of the cylinder so that the carriage 56 moves to the right to its initial position shown in FIG. 2. During such initial movement of the carriage 56, valve 232 will remain open and the shuttle valve 226 will be in its right position, as shown in FIG. 20. This will prevent the exhaust of air from the clamp actuator 190 to the line 224. As a consequence, the wire member 12 will remain clamped so, as the carriage begins its movement, the severed insulation will be pulled axially from the end of the wire 12. When the screw 257 of bracket 256 associated with the carriage 56 engages the left push-button of the valve 232, the valve will be moved to its closed position relative to the air supply 210 and air will be exhausted from the actuator 190 through the line 236 to the valve 232 to the atmosphere.

The brackets 256 and 258 also include adjustable screws 259 and 263 which activate a valve 233 which controls the flow of air pressure through tube 101 to provide the suction to expel waste insulation from the rotary stripping machine in response to movement of the carriage 56.

RESUME

A rotary wire stripping machine has been provided for stripping insulation and other material from the ends of various types of wire including coaxial cable. The invention includes provision for very accurately adjusting the depth of cut of the insulation to be removed from the these of the wire so that wires of varying diameters and thicknesses of the insulation can be accommodated to form a neat, clean wire end. In addition, the present invention provides means to straighten and to accurately align a wire so that it may be received within the cutting assembly of the stripping machine. The stripping machine operates at very high speeds and in repeated cycles with the various operations being performed during each cycle. Such operations include clamping a wire, cutting material on the end of the wire, removing the cut material from the end of the wire, and all of said operations are carried out in timed relationship to each other.

The stripping machine of the present invention is a marked advance over the prior art because it is structurally less complicated and cumbersome, because it facilitates greater accuracy of the depth of the cut of the stripper blades, and because it accommodates easy access to these adjusting means avoiding the necessity of disassembly of the mechanism.

I claim:

1. A rotary wire stripping machine comprising: a head member supported for movement between a first position spaced a predetermined distance from an end of a wire having insulation material thereon to a second position adjacent to said end of said wire, and for rotation about an axis in general alignment with the axis of said wire, said head member including a core having a chamber therein for receiving a predetermined part of the end of said wire when said head is in said second position, a pair of opposed blade members slidably supported in said core for rotation therewith and being movable radially with respect to said core, and an annular member surrounding and rotatably movable around said core and in respect thereto, said annular member having cam actuating means mounted thereon for forcing said blades to move radially inwardly in response to relative rotation of said core and annular member to engage and sever said insulation material at a point spaced from said end of said wire when said head is in said second position.

2. The machine set forth in claim 1 wherein said cam actuating means are pivotably mounted so as to be pivotable about an axis generally parallel to the axis of rotation of said head and wherein said annular member includes cam actuating adjustment means for controlling said radial inward movement of the blades.

3. The machine set forth in claim 1 wherein said core includes a pair of opposed radially extending grooves and said blades are held by blade guides slidable in said grooves so as to be movable radially, said blade guides including cam surfaces at their radially outer ends for sliding engagement with said cam actuating means when said annular member is rotated relative to said core.

4. The machine set forth in claim 1 wherein said annular member includes a releasable spring biased latch means and said core includes a notch for receiving said releasable spring biased latch for releasably locking the core member and annular member together to prevent relative rotation thereof and to maintain said blades in a radially inwardly engaged position.

5. A rotary wire stripping machine comprising: a head member supported for movement between a first position spaced a predetermined distance from an end of a wire having insulation material thereon to a second position adjacent to said end of said wire, and for rotation about an axis in general alignment with the axis of said wire, said head member including a core having a chamber therein for receiving a predetermined part of the end of said wire when said head is in said second position, a pair of opposed blade members slidably supported in said core for rotation therewith and being movable radially with respect to said core, and an annular member surrounding and rotatably movable around said core and in respect thereto within limits, said annular member having cam actuating means pivotally mounted thereon for forcing said blades to move radially inwardly in response to relative rotation of said core and annular member to engage and sever said insulation material at a point spaced from said end of said wire when said head is in said second position, and rigidly mounted brake means on said machine for causing relative rotation of said annular member and core whereby said cam actuating members bear against cam surfaces connected to said blades for forcing said blades to move radially inwardly.

6. The machine set forth in claim 5 wherein said annular member includes cam actuating adjustment means for controlling said radial inward movement of the blades, said adjustment means including screws threadably secured in bores extending radially through said annular member.

7. The machine set forth in claim 5 wherein said core includes a pair of opposed radially extending grooves and said blades are held by blade guides slidable in said grooves so as to be movable radially, said blade guides including cam surfaces at their radially outer ends for sliding engagement with said cam actuating means when said annular member is rotated relative to said core.

8. The machine set forth in claim 5 wherein said annular member includes a releasable spring biased latch means and said core includes a notch for receiving said latch means for securing the core and annular member in such a manner as to prevent relative rotation thereof and thereby maintaining said blades in radially inward engagement.

9. The machine set forth in claim 8 further including a latch camming means for biasing said latch means out of said notch to allow relative rotation of said core and said surrounding annular member.

10. The machine set forth in claim 5 wherein said cam actuating members are pivotable about an axis parallel to the axis of rotation of said head.

11. A rotary wire stripping machine for removing insulation from the end of an insulated wire comprising: a carriage movable in a predetermined path between first and second positions; a head member mounted on said carriage for movement therewith, and for rotation about an axis in general alignment with the axis of said wire, said head being spaced from the end of said wire when said carriage is in said first position and said head member including a core having a chamber therein for receiving a predetermined part of the end of said wire when said head is in said second position, a pair of opposed blade members slidably supported in said core for rotation therewith and being movable radially with respect to said core, and an annular member surrounding and rotatably movable around said core and in respect thereto within limits, said annular member having a cam actuating member pivotally mounted thereon for forcing said blades to move radially inwardly in response to relative rotation of said core and annular member to engage and sever said insulation material at a point spaced from said end of said wire when said head is in said second position; and spring biased brake means secured to said machine for causing relative rotation of said annular member and core whereby said cam actuating members bear against cam surfaces connected to said blades for forcing said blades to move radially inwardly.

12. The machine set forth in claim 11 wherein said brake means for causing relative rotation of said annular member and core includes a pair of brake members spring biased against opposite sides of an outer surface of said annular member and wherein said carriage includes a pivotally mounted brake camming means engageable to force said spring biased brake assembly out of engagement with said member.

13. The apparatus set forth in claim 11 including rigidly mounted stop means for activating said pivotable camming means in response to movement of said carriage from said first position to said second position.

14. The machine set forth in claim 11 wherein said carriage means is mounted upon a plurality of pivotable linkage members for movement in said predetermined path between said first and second positions and is moved by a fluid pressure means.

15. An apparatus for stripping insulation from wire for use with a wire conveyor means having a plurality of support means associated with and movable by said conveyor means to hold a plurality of insulated wire members with end portions projecting from said support means and comprising: a rotatable head member reciprocating relative to the supported wire between initial and wire receiving positions, said head member including a core having a chamber therein for receiving a predetermined part of the end portion of said wire, a pair of opposed blade members slidably supported in said core for rotation therewith and being movable radially inwardly, and an annular member surrounding and rotatably movable around said core and in respect thereto and including cam actuating means for forcing said blades to move radially inwardly in response to relative rotation of said core and annular member to engage and sever insulation material from the end of said wire, a clamp member reciprocating relative to said supported wire between a wire clamping position and a wire released position; and fluid pressure operated actuator means to reciprocate said head and clamped members in timed relation to each other and including valve means controlling communication between a source of fluid pressure and said actuator means and having a first position to reciprocate said head member to a wire receiving position and simultaneously to reciprocate said clamp member to said clamping position and having a second position to move said head member to said initial position.

\* \* \* \* \*